Figure 11:
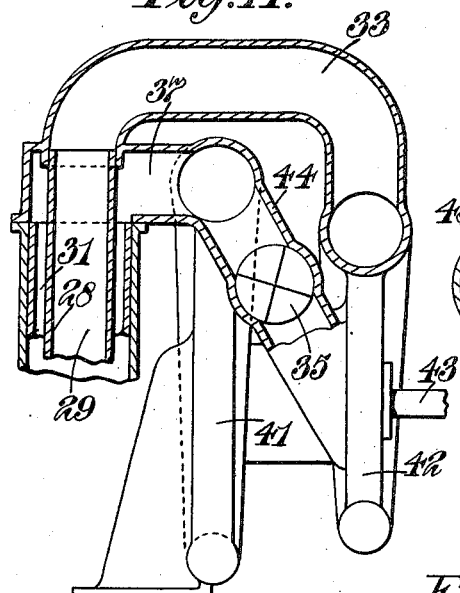

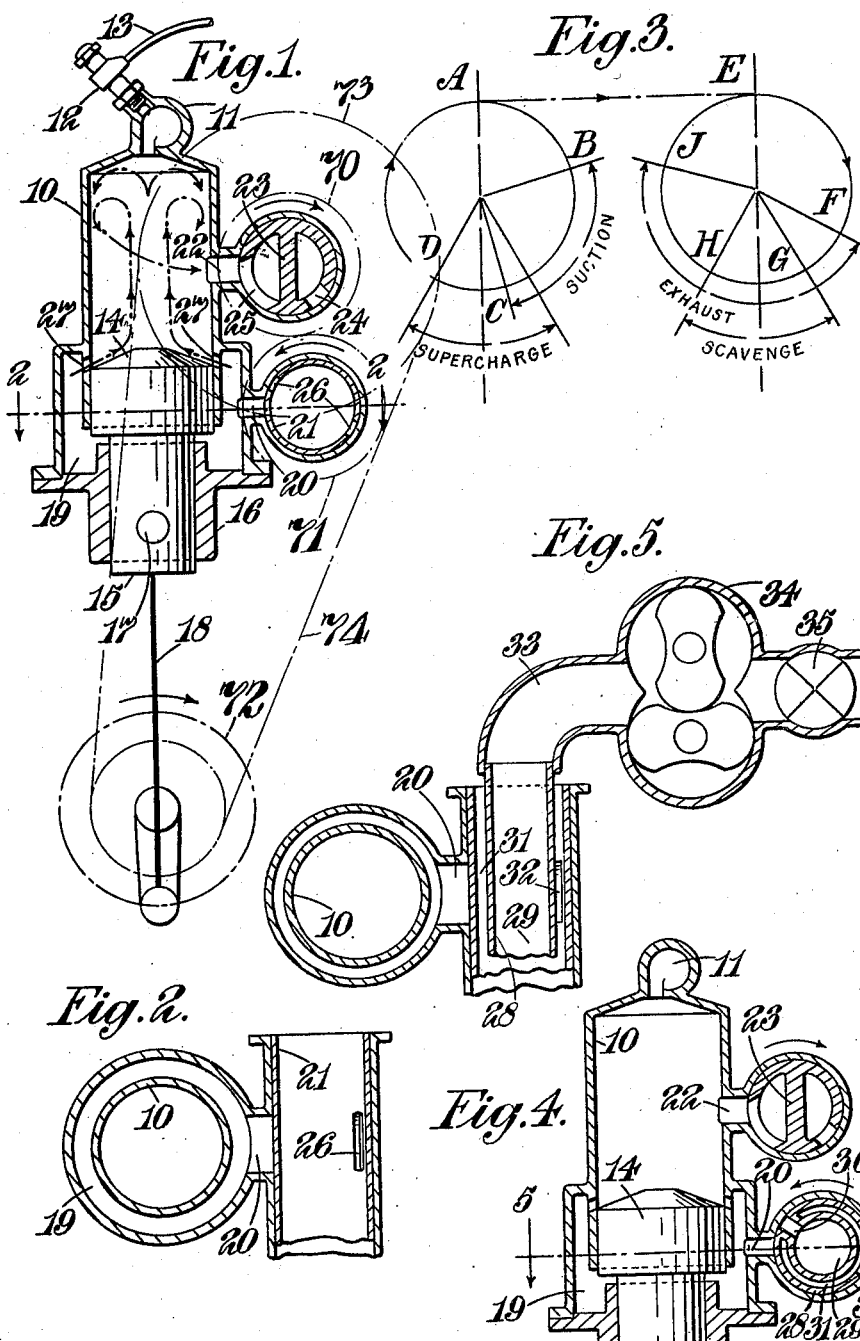

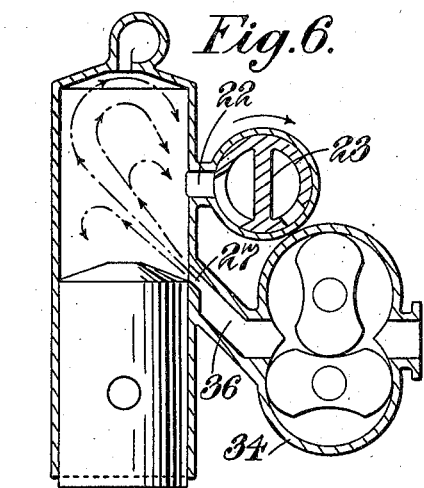
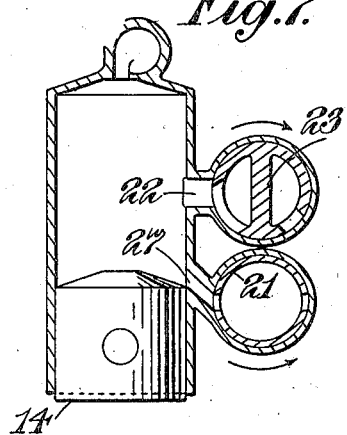
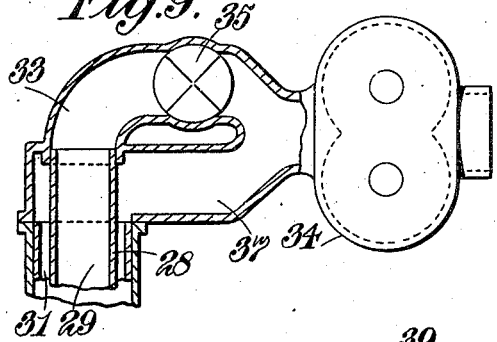
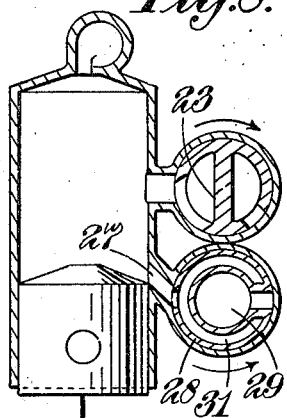
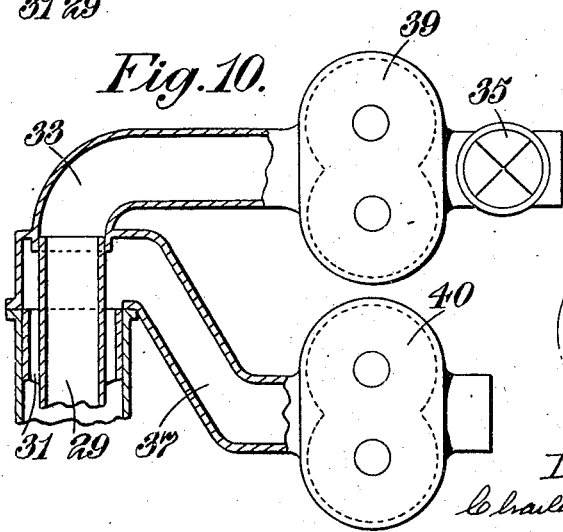

March 8, 1938. C. H. T. ALSTON 2,110,754
COMBUSTION ENGINE
Filed Nov. 25, 1936 5 Sheets-Sheet 3

Inventor:
Charles Henry Thomas Alston,
By Stebbins, Blenko & Parmelee, attys

March 8, 1938.  C. H. T. ALSTON  2,110,754
COMBUSTION ENGINE
Filed Nov. 25, 1936  5 Sheets-Sheet 4

Inventor:
Charles Henry Thomas Alston,
By Stebbins, Blenko & Parmelee, attys.

March 8, 1938. C. H. T. ALSTON 2,110,754
COMBUSTION ENGINE
Filed Nov. 25, 1936 5 Sheets-Sheet 5

Inventor:
Charles Henry Thomas Alston,
by Stebbins, Blenko & Parmelee, attys.

Patented Mar. 8, 1938

2,110,754

UNITED STATES PATENT OFFICE 2,110,754

COMBUSTION ENGINE

Charles Henry Thomas Alston, Sidmouth, Devon, England

Application November 25, 1936, Serial No. 112,804
In Great Britain November 30, 1935

12 Claims. (Cl. 123—76)

This invention is for improvements in four-stroke cycle internal-combustion engines of the kind in which one or more inlet and exhaust ports in the cylinder wall communicate with a rotary distributing valve by which the inlet and exhaust gases are controlled.

The invention is principally intended for application to compression-ignition engines but may also be applied to engines having spark-ignition.

The principal objects of this invention are to provide a four-stroke cycle engine capable of high specific output (with a clean exhaust) having a combustion chamber free from valves and also to dispense with reciprocating valve gear and to cushion the inertia of the parts on the exhaust stroke.

The engine belongs to that type in which a port or ports are placed in the wall of the working cylinder so arranged as to be covered by the piston when at the top of its stroke which ports communicate with a rotary distributing valve for inlet and exhaust, the intention being to protect the valve from the highest temperature and pressure.

In such engines as hitherto constructed it has been found that these ports cannot be placed sufficiently far down the piston stroke for the adequate shielding of the rotary valve from excessive temperature and pressure without the performance of the engine suffering on account of the very imperfect expulsion of the exhaust gases and restriction of the volume of the new charge from this cause.

In carrying this invention into effect the ports leading to the rotary valve (hereinafter termed the "main ports") are placed well down the stroke, say about the middle of the stroke, so as to be uncovered by the top of the piston when it has performed about 40% or 50% of its downstroke.

By that time the temperature and pressure of the expanding gases are much reduced and, therefore, the leakage past the valve is less as are also the ill effects of such leakage, and the conditions under which the valve operates are much improved.

As the piston approaches the end of its power stroke the rotary valve in turning opens the main ports in the cylinder wall to the exhaust pipe and the expanded gases discharge themselves to the atmosphere. Shortly afterwards scavenging air is admitted through another port or ports from a source under pressure.

This air is directed upwards towards the combustion chamber and the upper part of the cylinder displacing the exhaust gases therein out at the main ports.

The piston rises displacing the exhaust gas remaining immediately above it through the main ports until it covers the latter. Thereafter, until the top of the upstroke, the piston compresses the air, or air and exhaust products, above it into the combustion chamber absorbing the inertia of the piston line and cushioning the parts.

On the succeeding downstroke this air reexpands restoring most or all of the work done in compressing it until the main ports in the wall are again uncovered.

By this time the rotary valve has turned closing the opening to the exhaust pipe and opening that to the air inlet.

Thereafter the piston draws in air through the main ports until near the end of its downstroke when the air inlet port shuts and the auxiliary ports through which the scavenging air was admitted again open and air under pressure once more enters the cylinder and, since there is now no outlet, supercharges the contents of the cylinder to a pressure above atmospheric.

Specific embodiments of the present invention will now be described by way of example with reference to the accompanying diagrammatic drawings of a four-stroke cycle compression-ignition engine, although in certain cases the invention may also be applied to engines having spark-ignition.

Figure 12:
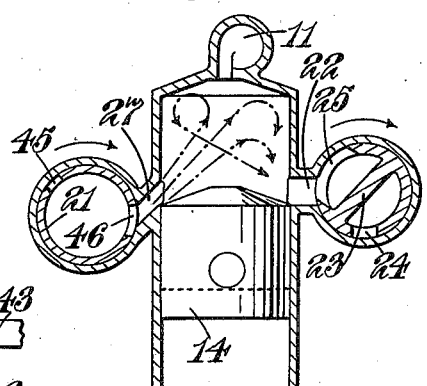
Figure 13:
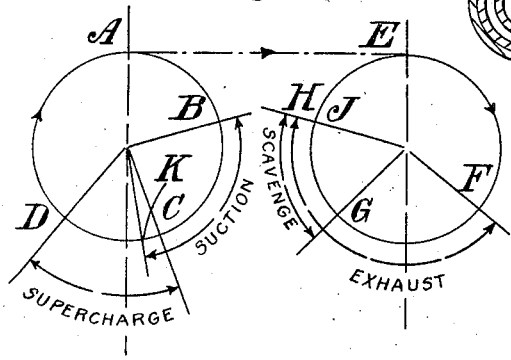
Figure 14:
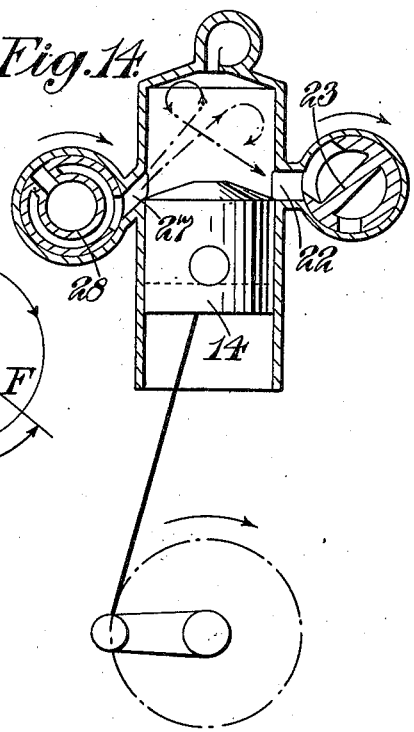
Figure 15:
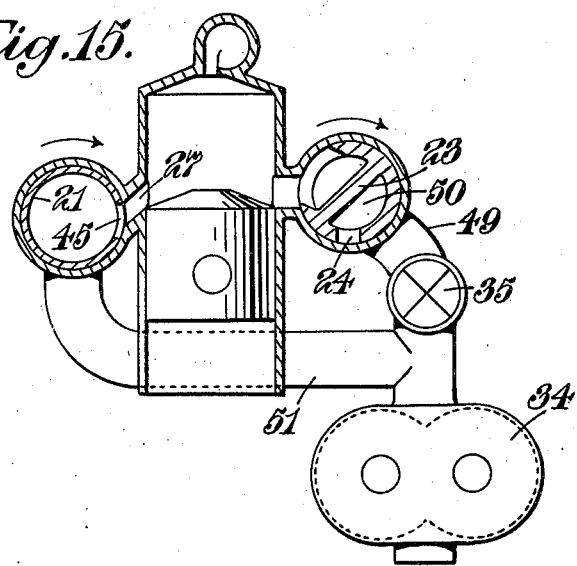
Figure 17:
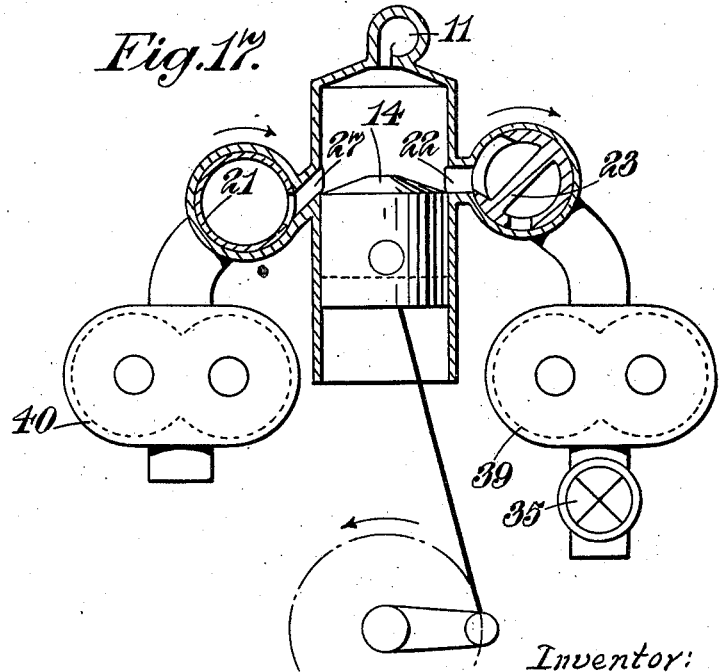
Figure 16:
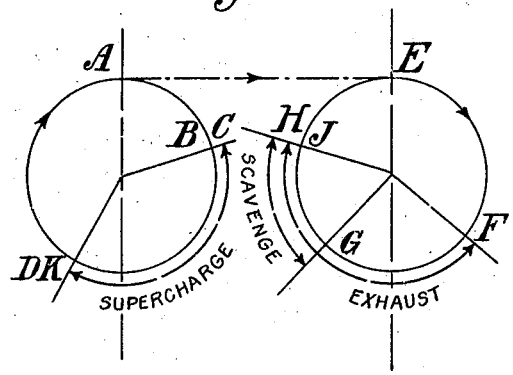
Figure 18:
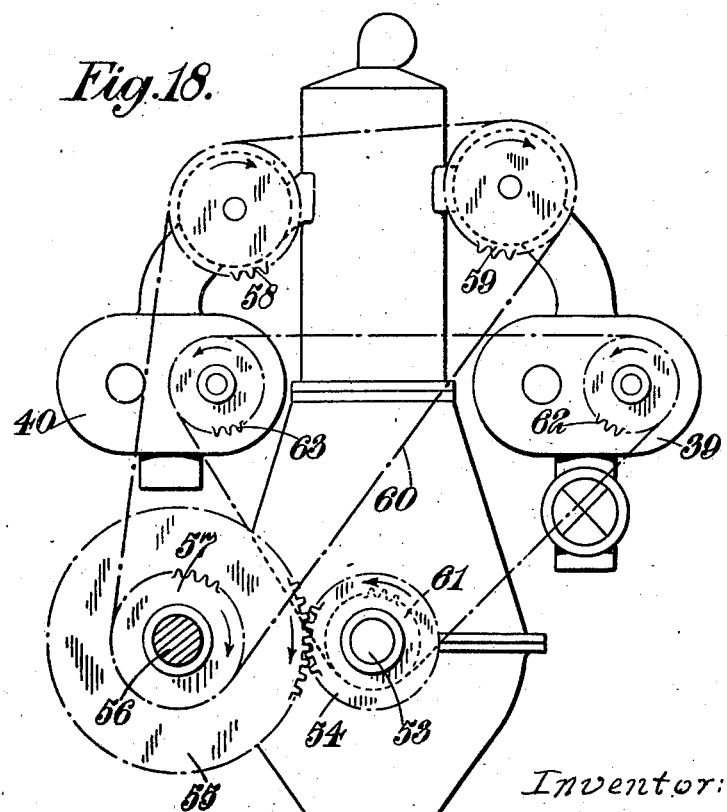

In the drawings,

Figure 1 shows one form of the invention in which the piston of the engine also constitutes a supercharging and scavenging pump, Figure 2 is a sectional plan on the line 2—2 of Figure 1, Figure 3 is a valve-diagram of the engine of Figures 1 and 2, Figure 4 illustrates an alternative form of Figure 1, Figure 5 being a sectional plan on the line 5—5 of Figure 4, Figure 6 illustrates an arrangement in which an external supercharger is used, Figure 7 being an alternative to Figure 6, Figure 8 illustrates an alternative form of Figures 6 and 7, in which compressed air is admitted to the cylinder through a double valve, Figure 9 is a plan showing one arrangement of supercharger for the engine of Figure 4 or Figure 8, whilst Figures 10 and 11 show alternatives to Figure 9, Figure 12 illustrates a modification in which the two valves are arranged at the same level and on opposite sides of the cylinder wall, Figure 13 is a valve diagram of the engine shown in Figure 12, Figure 14 is an alternative form of the engine shown in Figure 12, Figure 15 illustrates a modification in which the supercharging air is supplied through the inlet valve, Figure 16 is a valve diagram of the engine of Figure 15, Figure 17 is an alternative form of the invention of Figure 15, whilst Figure 18 shows how the valves and blowers of Figure 17 may be driven from the crankshaft.

Like parts are denoted by the same reference numerals throughout the several figures of the drawings.

As shown first in Figures 1 and 2, the cylinder 10 is formed with an injection chamber 11 at the top, with which chamber an injection nozzle 12 communicates, being supplied with liquid fuel through a conduit 13.

The piston 14 is formed with a portion 15 of reduced diameter which is guided in a crosshead guide 16 and which is connected by a gudgeon pin 17 and connecting rod 18 to the crank pin in the usual way. Surrounding the lower end of the cylinder 10 is a chamber 19 having a port 20 communicating with a rotary valve 21.

About half-way up the cylinder wall is a port 22 communicating with a rotary valve 23 which is formed with two ports 24 and 25 whose function is to admit a charge of air to the cylinder and to open the cylinder to exhaust, respectively.

As shown also in Figure 2, the rotary valve 21 is formed with two ports 26 through which air is admitted to the chamber 19 for a purpose described below. However the invention is not limited to the use of rotary valves for the control of the scavenging or supercharging air.

The cycle performed by the engine of Figures 1 and 2 will now be described with reference also to Figure 3 which is the usual valve diagram, the charging revolution being shown on the left and the power revolution on the right.

The piston will be considered as starting from the beginning of the charging stroke so that it is at the top of the cylinder. This position is shown by A in Figure 3. The chamber 11, for reasons explained below, already contains compressed air and as the piston moves down, this air expands so that substantially the whole of the energy which was used in compressing it is regained. When the crown of the piston 14 reaches the port 22, the valve 23 will have rotated into a position in which the port 24 registers with the port 22 so that air is now free to enter the cylinder. This position is shown as B in Figure 3. Suction of the charge into the cylinder continues until nearly the end of the stroke, when the valve 23 closes the port 22.

During the downward movement of the piston the annular overhanging portion represented by the difference in diameter between the parts 14 and 15 of the piston compresses the air in the chamber 19, the port 20 remaining closed by the rotary valve 21, so that when the piston reaches a point near the bottom of its stroke as shown by C in Figure 3, the compressed air from the chamber 19 enters the cylinder through ports 27 formed at the bottom of the cylinder wall. The cylinder is thus supercharged and the ports 27 remain open until a point early in the succeeding up-stroke of the piston denoted by D in Figure 3. Early in the up-stroke of the piston, one of the ports 26 in the rotary valve 21 registers with the port 20 so that the piston sucks air from the atmosphere into the chamber 19. The port 22 being closed by the valve 23, upward movement of the piston compresses the charge of air in the cylinder, which compression continues until the top dead-centre (E, Figure 3) has been reached. At or near the top of the stroke of the piston, fuel is injected through the nozzle 12 and combustion ensues.

The piston now begins to move down on its power stroke and as it does so it compresses another charge of air in the chamber 19, the port 20 again being closed by the valve 21.

During the power stroke the rotary valve 23 is protected from the intense pressure and heat in the combustion chamber until the crown of the piston uncovers the port 22 and by this time the heat and pressure will have considerably diminished owing to the expansion of the charge. At a point (F, Figure 3) between the uncovering of the port 22 and the end of the stroke, the port 25 in the rotary valve 23 moves into register with the port 22 whereby the products of combustion are discharged through an exhaust passage. Finally, as the piston nears the position shown in Figure 1, the ports 27 again open (G, Figure 3) and compressed air from the chamber 19 enters the cylinder and is directed upwardly in a central column as shown by the arrows in Figure 1 so as to displace the exhaust gases. By this arrangement the exhaust gases at the top of the cylinder are driven out by the scavenging air and the remainder of the exhaust is expelled by the rising piston.

Early in the succeeding up-stroke of the piston 14, the ports 27 are closed, this point being shown by H in Figure 3. Expulsion of the exhaust gases continues, however, until the crown of the piston passes the port 22 and soon afterwards, at the point J, Figure 3, the valve 23 closes the port 22. The top of the cylinder now contains clean air with a small proportion of products of combustion mixed with it, and this mixture is compressed during the remaining part of the up-stroke of the piston, thereby absorbing the inertia of the piston and other moving parts. The point A is now reached again and the cycle has been completed.

The valves 21 and 23 may be driven by a sprocket 72 on the crankshaft, which engages a chain 74 driving a sprocket 73 carried by the valve 23. The valve 23 also carries a gear 70 which meshes with a gear 71 carried by the valve 21. The sprocket 73 is twice the diameter of the sprocket 72 and the gears 70 and 71 are of equal diameter so that the valves 21 and 23 are driven in the directions of the arrows at one-half of the crankshaft speed. Similar driving arrangements may be employed for the valves of the forms of the invention illustrated in the other figures of the drawings.

In the arrangement described with reference to Figures 1 and 2, the differential piston 14, 15 provides the compression both for scavenging and for supercharging, but in the modified arrangement of Figures 4 and 5, the valve 21 is replaced by a composite valve 28 having two chambers; an inner chamber 29 which communicates with the port 20 through a port 30 and an outer chamber 31 which communicates with the port 20 through a port 32. As shown in Figure 5, the chamber 29 is connected by a suitable rotating joint to the discharge pipe 33 of a rotary pump 34 on the intake side of which is a controlling or reducing valve 35. The chamber 31 on the other hand, is permanently open to the atmosphere.

The cycle of the engine shown in Figures 4 and 5 is identical with that already described with reference to Figures 1, 2, and 3 but it has the advantage that the degree of supercharge can be augmented and regulated by the controlling valve 35, the pressure necessary for scavenging being constant and obtained by the differential piston as before.

The form of the invention shown in Figures 1 and 4 may employ, in combination, a rotary pump or blower to increase the supercharging pressure produced by the pumping chamber below the piston. The blower could be connected to the pumping chamber through a distributing valve in such manner that the scavenging air pressure is unaugmented and only the supercharging air has its pressure increased.

In some cases, instead of constructing the piston with a reduced portion 15 working in a crosshead as shown in Figures 1 and 4, the arrangement shown in Figure 6 may be used with advantage. Here the port or ports 27 are supplied with air under pressure through a conduit 36 from the discharge side of a rotary pump 34 which thus serves for supplying both the scavenging air and the supercharging air. The scavenging air rises to the top of the cylinder as shown by the arrows. In the arrangement of Figure 6, the ports 27 are opened and closed solely by the movement of the piston 14, but in the alternative arrangement shown in Figure 7, the ports 27 may be controlled by a rotary valve 21 similar to that shown in Figure 1. The interior of the valve is, in this case, supplied with air under pressure by a rotary pump similar to the pump 34 of Figures 5 and 6.

A further alternative possibility is shown in Figures 8 and 9. In this form of the invention the ports 27 are controlled by a rotary valve 28 similar to that shown in Figure 4, but whereas the chamber 31 in Figure 4 is directly open to the atmosphere, in Figure 9 this chamber is supplied with air under pressure through a separate conduit 37 from the rotary pump 34. The conduit 33, in this case, through which the supercharging air is supplied to the central chamber 29 of the valve is fitted with the regulating valve 35 so that the scavenging air and the supercharging air are both supplied by the rotary pump 34, but whereas the pressure of the scavenging air remains constant, the pressure of the supercharging air may be controlled by means of the valve 35.

Instead of using a single pump 34 for supplying both scavenging air and supercharging air, separate pumps 39, 40 respectively, may be used as shown in Figure 10 which is an alternative to that shown in Figure 9. Here the two conduits 33 and 37 are entirely separate and the controlling valve 35 may be arranged on the intake side of the pump 39 which is an advantageous arrangement.

Yet another possibility is illustrated in Figure 11 in which the rotary pumps are replaced by a two-stage centrifugal blower 41, 42 the rotors of which are carried on a common shaft 43 which may be driven by any suitable means such as an exhaust-driven turbine. The first stage 41 discharges through a conduit 37 into the chamber 31 of the rotary valve 28 and part of the compressed air passes by way of a conduit 44 into the intake of the second-stage blower 42. The blower 42 discharges through a conduit 33 into the chamber 29 which, as has already been explained, supplies the supercharging air to the cylinder. The controlling valve 35 is arranged in the communicating conduit 44 so that the degree of supercharge may be regulated thereby. The pressure of the scavenging air, however, is produced by the blower 41 and remains constant.

A modified form of the invention is shown in the diagram of Figure 12 in which the rotary valve 23 is similar to that already described with reference to Figure 1, but the ports 27 for the inlet of scavenging and supercharging air are arranged not at the bottom of the cylinder but at a point on a level with the port 22. The ports 27 are controlled by a rotary valve 21 having ports 45 and 46. The cycle of the engine shown in Figure 12 will now be described with reference to the valve diagram of Figure 13, like letters being used for points in the cycle corresponding to those shown in Figure 3.

At the top dead-centre A the chamber 11 contains compressed air as in the case of Figure 1 and as the piston moves down on the charging stroke, this air expands and the energy which was expended on compressing it is substantially regained. When the piston 14 uncovers the port 22 the valve 23 has moved into a position in which the inlet port 24 registers with the port 22 so that air for combustion can be sucked into the cylinder by the remaining part of the downstroke of the piston. Suction takes place from B to K. When the piston is nearly at the bottom of its stroke the valve 21 brings the port 45 into register with the port or ports 27, whereby air under pressure is admitted to the cylinder and continues to be admitted over a period CD, D occurring during the early part of the succeeding upward travel of the piston. All the ports are now closed and the charge of air is compressed until the piston again reaches the top dead-centre at E. Fuel injection and combustion ensue and the piston moves down on its power stroke. About half-way down its stroke it uncovers the ports 22 and 27 so that the valves 21 and 23 are exposed to the heat and pressure of the burning charge in the cylinder, but by the time this point is reached the heat and pressure have considerably diminished so that the valves are not damaged. At a point F near the end of the down-stroke, the valve 23 brings the port 25 into register with the port 22 so that exhaust takes place and continues well into the succeeding up-stroke of the piston. However, soon after the beginning of such up-stroke (G, Figure 13), the valve 21 brings the port 46 into register with the ports 27, whereby air under pressure is blown into the cylinder and the exhaust gases are swept out through the port 22 and are largely replaced by clean air. This scavenging action continues until the crown of the piston covers the ports 22 and 27, this point being shown by the point HJ in Figure 13. The remaining part of the up-stroke of the piston is occupied by compressing the substantially clean air remaining in the cylinder until the point A is again reached and the cycle has been completed.

The arrangements shown in Figures 12, 14, and 15 may be used in combination with a pumping chamber of the kind described with reference to Figure 1 for supplying the compressed air. That is to say, the piston would compress the air but the valve 21 similar to that shown in Figure 12 would supply a port about half-way up the wall of the cylinder. Such an arrangement has the advantage that it obviates the difficulties caused by leakage past the piston near the end of the down-stroke. In a further modification of this form of the invention, the clearance volume below the piston may be replaced by a separate receiver in which the air is compressed prior to its admission to the cylinder. Such an arrangement has the advantage that it provides more scope for timing the entry of the scavenging air.

In the alternative arrangement shown in Figure 14, the valve for controlling the ports 27 is modified to correspond to the valve 28 of Figure 4 in which there are separate compartments for supercharging and scavenging air. These separate compartments may communicate respectively with sources of air at different pressure. Otherwise the arrangement is identical with that described with reference to Figures 12 and 13.

In the modified arrangement of Figure 15 the valve 21 is used solely for supplying the scavenging air to the cylinder and supercharging is effected by supplying air under pressure to the port 24 in the valve 23. A rotary pump 34 discharges through a conduit 49 to the chamber 50 in the valve 23 with which the port 24 communicates. The conduit 49 contains a controlling valve 34 whereby the degree of supercharge may be regulated. A branch pipe 51 delivers compressed air from the pump to the interior of the valve 21 from which it passes through the ports 45 and 27 into the cylinder.

The cycle obtained with the engine of Figure 15 is shown in the valve diagram of Figure 16.

The arrangement of Figure 15 may be modified as shown in Figure 17 by the employment of separate pumps 39 and 40 for the supercharging and scavenging air respectively. In this arrangement the controlling valve 35 may be advantageously disposed on the intake side of the pump 39.

The various rotating accessories of Figure 17 may be driven by the crankshaft as shown in Figure 18. The crankshaft 53 carries a pinion 54 which drives a gear 55 on a lay-shaft 56. The lay-shaft also carries a chain-sprocket 57 and similar sprockets 58 and 59 are carried respectively by the valves 21 and 23. A single chain 60 passes around all three sprockets. The gear 55 has twice as many teeth as the pinion 54 so that the valves 21 and 23 are driven at one-half crankshaft speed which is the requirement for the cycle above described.

The crankshaft also carries a sprocket 61 and the blowers 39 and 40 carry similar sprockets 62 and 63. A chain 64 engages all three sprockets whereby the blowers 39 and 40 are driven at crankshaft speed; although any suitable gear-ratio may be employed.

It will be understood that the accompanying drawings are merely diagrammatic and that the external and general arrangement of an engine according to the invention may be of conventional form. Any number of cylinders may be employed and the blowers illustrated may supply all the cylinders. Where the cylinders are arranged in line, each of the valves shown may extend continuously along the line of cylinders having ports suitably arranged according to the timing of each.

I claim:—

1. In an internal combustion engine of the four-cycle type, a cylinder, a piston in the cylinder, a port in the cylinder wall so located that it is uncovered by the piston only after a portion of its stroke has been completed, and a rotary distributing valve connected to said port and of such a character that at one period of the operating cycle the contents of the cylinder may be discharged through the port and during another period of the operating cycle air may be admitted to the cylinder through the port.

2. In an internal combustion engine of the four-cycle type, a cylinder, a piston in the cylinder, a port in the cylinder wall so located that it is uncovered by the piston only after a portion of its stroke has been completed, a rotary distributing valve connected to said port and of such a character that at one period of the operating cycle the contents of the cylinder may be discharged through the port and during another period of the operating cycle air may be admitted to the cylinder through the port, and means for admitting scavenging air to the cylinder during part of the exhaust period.

3. In an internal combustion engine of the four-cycle type, a cylinder, a piston in the cylinder, a port in the cylinder wall so located that it is uncovered by the piston only after a portion of its stroke has been completed, a rotary distributing valve connected to said port and of such a character that at one period of the operating cycle the contents of the cylinder may be discharged through the port and during another period of the operating cycle air may be admitted to the cylinder through the port, means for admitting scavenging air to the cylinder during part of the exhaust period, and means for supercharging the cylinder.

4. A four-stroke cycle internal combustion engine comprising a piston, a cylinder having a wall, an inlet and exhaust port so placed in said wall as to be covered by the piston when at the top of its stroke, a rotary distributing valve communicating with said port, and means for admitting scavenging air to the cylinder during part of the exhaust period to prevent the trapping of exhaust gas in the cylinder.

5. A four-stroke cycle internal combustion engine comprising a piston, a cylinder having a wall, an inlet and exhaust port so placed in said wall as to be covered by the piston when at the top of its stroke, a rotary distributing valve communicating with said port, means for admitting scavenging air to the cylinder during part of the exhaust period to prevent the trapping of exhaust gas in the cylinder, and means for supercharging the cylinder.

6. A four-stroke cycle internal combustion engine comprising a piston, a cylinder wall, an inlet and exhaust port so placed in said wall as to be covered by the piston when at the top of its stroke, a rotary distributing valve communicating with said port, and scavenge ports arranged near the bottom of the swept space of the cylinder.

7. A four-stroke cycle internal combustion engine comprising a piston, a cylinder wall, an inlet and exhaust port so placed in said wall as to be covered by the piston when at the top of its stroke, a rotary distributing valve communicating with said port, and scavenge ports arranged at a point about half way down the swept space of the cylinder.

8. A four-stroke cycle internal combustion engine comprising a piston, a cylinder wall, an inlet and exhaust port so placed in said wall as to be covered by the piston when at the top of its stroke, a rotary distributing valve communicating with said port, scavenge ports arranged at or near the bottom of the swept space of the cylinder, and means for supercharging the cylinder through said inlet and exhaust port.

9. A four-stroke cycle internal combustion engine comprising a piston, a cylinder wall, an inlet and exhaust port so placed in said wall as to be covered by the piston when at the top of its stroke, a rotary distributing valve communicating with said port, ports disposed near the bottom of the swept space of the cylinder for the admission of super-charging and scavenging air, a valve-controlled conduit leading to the said ports, and means for compressing by the piston the scavenging air and the air for supercharging prior to their admission to the cylinder.

10. A four-stroke cycle internal combustion engine comprising, in combination with the features claimed in claim 5, means for supplying the scavenging air and the supercharging air at different pressures.

11. A four-stroke cycle internal combustion engine comprising, in combination with the features claimed in claim 6, means for supplying the scavenging air and the supercharging air at different pressures.

12. A four-stroke-cycle internal-combustion engine comprising, in combination with the features claimed in claim 7, means for supplying scavenging air and supercharging air to the said scavenge ports at different pressures.

CHARLES HENRY THOMAS ALSTON.